(12) United States Patent
Chou

(10) Patent No.: US 6,336,531 B1
(45) Date of Patent: Jan. 8, 2002

(54) BRAKING DISC ASSEMBLY

(76) Inventor: Tzu-Chieh Chou, 7F-1, No. 626, Chung Met Street, Taichung (TW)

( * ) Notice: Subject to any disclaimer, the term of this patent is extended or adjusted under 35 U.S.C. 154(b) by 0 days.

(21) Appl. No.: 09/525,691

(22) Filed: Mar. 15, 2000

(51) Int. Cl.$^7$ .............................................. F16D 63/10
(52) U.S. Cl. .............................. 188/218 XL; 188/18 A; 188/26
(58) Field of Search ............................. 188/26, 218 XL, 188/18 A

(56) References Cited

U.S. PATENT DOCUMENTS

| | | | |
|---|---|---|---|
| 3,774,933 A | * 11/1973 | Asberg ...................... | 188/18 A |
| 4,913,266 A | * 4/1990 | Russell et al. ............ | 188/18 A |
| 5,570,760 A | * 11/1996 | Lai .............................. | 188/26 |
| 5,921,633 A | * 7/1999 | Neibling et al. .......... | 188/18 A |
| 6,076,896 A | * 6/2000 | Bertetti et al. ............ | 188/18 A |

* cited by examiner

*Primary Examiner*—Stephen T. Gordon
*Assistant Examiner*—Lori L Coletta
(74) *Attorney, Agent, or Firm*—Browdy and Neimark

(57) ABSTRACT

A braking disc assembly is mounted on a bicycle hub to work along with a disc brake of the bicycle and is formed of a fastening seat, a disc body, and a plurality of connection sets. The fastening seat is provided with a plurality of clamping portions, with each clamping portion having two clamping pieces. The clamping pieces are provided with a through hole. The disc body is provided with a hollow portion and a plurality of insertion portions, with each inserting portion having a locating hole. The connection sets comprise a locking member, a fastening bolt, and a spring. The fastening seat is fastened in the hollow portion of the disc body by the locking member which is engaged with the fastening bolt via the through hole of the fastening seat and the locating hole of the disc body. The spring is fitted over the locking member such that the spring urges at one end thereof the fastening seat, and at other end thereof the disc body. The disc body is capable of making an adjustment in position at such time when the disc body is pressed against by two brake pieces of the disc brake of the bicycle.

4 Claims, 6 Drawing Sheets

BRAKING DISC ASSEMBLY

FIELD OF THE INVENTION

The present invention relates generally to a bicycle braking system, and more particularly to a braking disc of the bicycle system.

BACKGROUND OF THE INVENTION

As shown in FIGS. 1 and 2, a braking disc assembly of the prior art comprises a hub 2, a shaft sleeve seat 3 fastened with one end of the hub 2, a disc fastening seat 4 engaged with the shaft sleeve seat 3 such that an elastic ring 6, a collar 7 and a retaining ring 8 are held between the shaft sleeve seat 3 and the disc fastening seat 4 on which a disc 5 is mounted. The elastic ring 6 and the collar 7 enable the disc 5 to remain in a floating state so as to engage the brake pieces.

Such a prior art braking disc as described above is defective in design in that the floating stroke of the disc 5 is confined by the deformabilities of the elastic ring 6 and the collar 7, thereby undermining the braking effect of the disc 5. If the elastic ring 6 and the collar 7 are caused to deform by means of compression, the disc 5 is subjected to a great lateral force which inhibits the displacement of the disc 5. When the disc 5 is pressed against by the brake pieces, the braking effect is apt to be seriously undermined by the inadequacy in displacement or floating stroke of the disc 5. In other words, the prior art braking disc has an inherent structural deficiency.

SUMMARY OF THE INVENTION

The primary objective of the present invention is to provide a braking disc which is capable of position adjustment at the time when the braking disc is clamped by the brake pieces.

In keeping with the principle of the present invention, the foregoing objective of the present invention is attained by a braking disc assembly comprising a fastening seat, a disc body, and at least two connection sets. The fastening seat is mounted on a bicycle hub and is provided with at least two clamping portions, with each having two clamping pieces. The disc body is provided in the center thereof with a receiving portion for holding the fastening seat. The connection sets are composed of a locking member, a bolt, and a spring. The fastening seat is secured to the receiving portion of the disc body by the locking member which is received in a through hole of the clamping piece of the fastening seat and a locating hole of the disc body. The bolt is engaged with an inner threaded portion of the locking member. The spring is fitted over the locking member such that the spring urges at one end thereof the disc body, and at other end thereof the fastening seat.

DETAILED DESCRIPTION OF THE INVENTION

Figure 1:
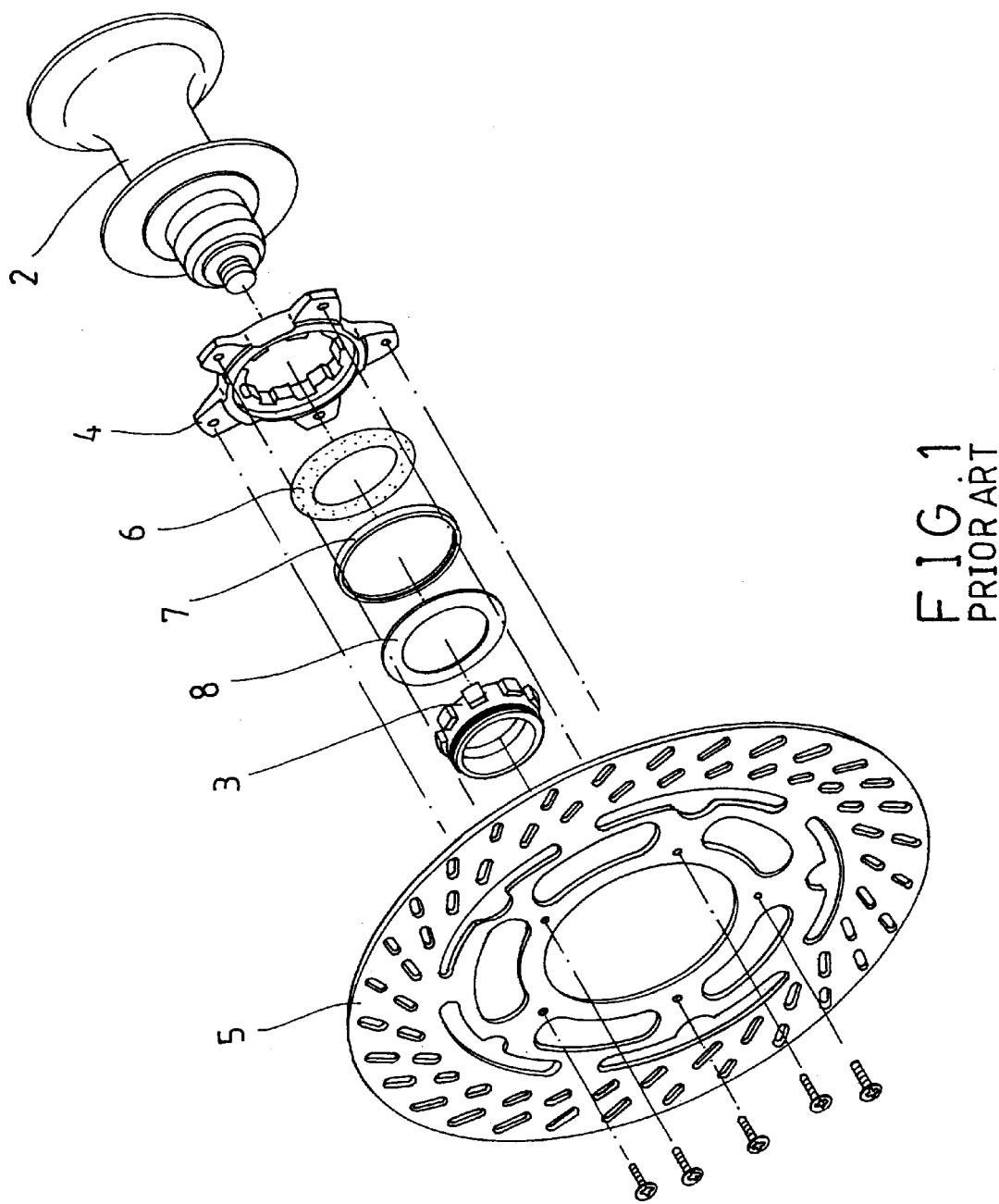
FIG. 1 shows an exploded view of a braking disc assembly of the prior art.
Figure 2:
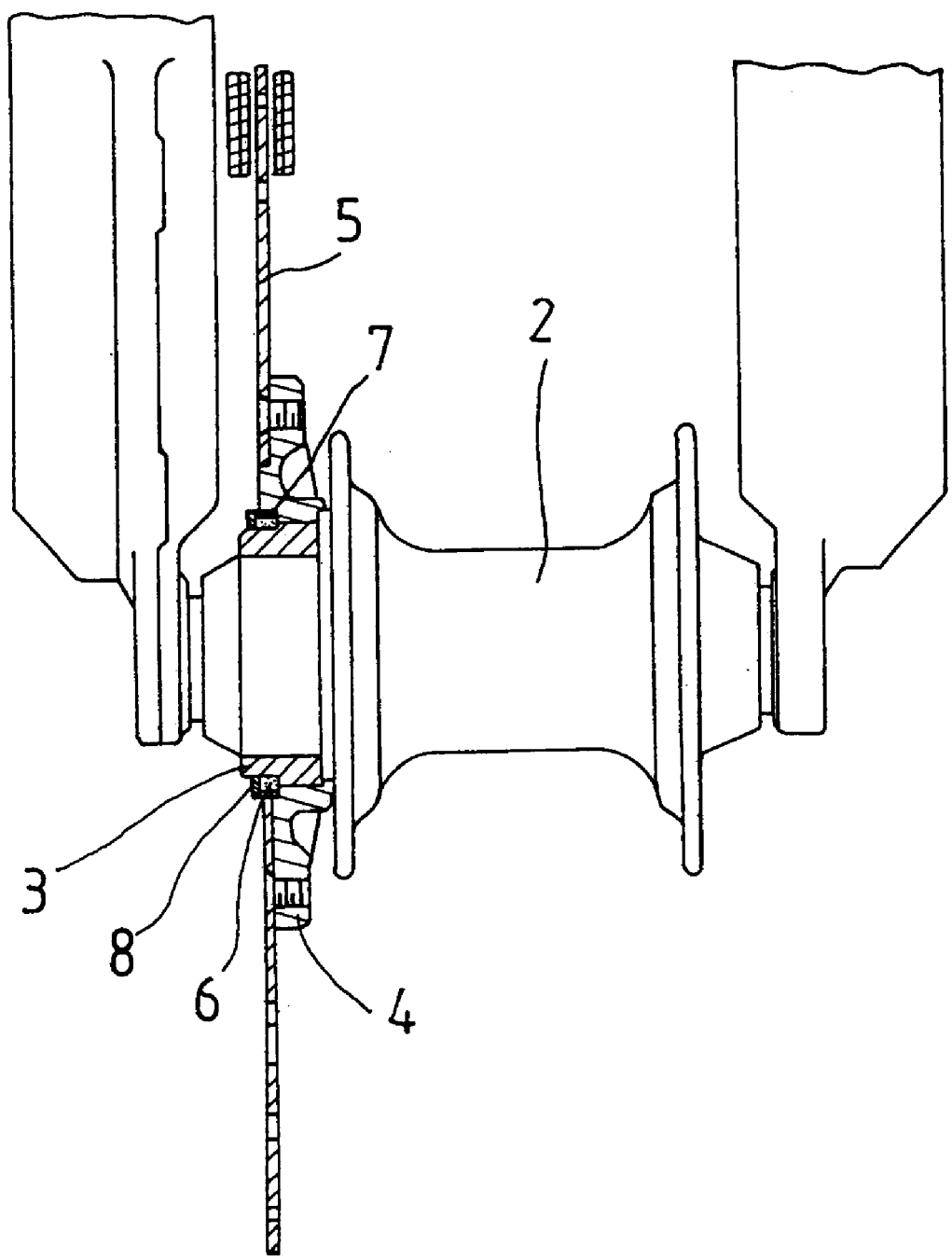
FIG. 2 shows a sectional view of the prior art braking disc assembly in combination.
Figure 3:
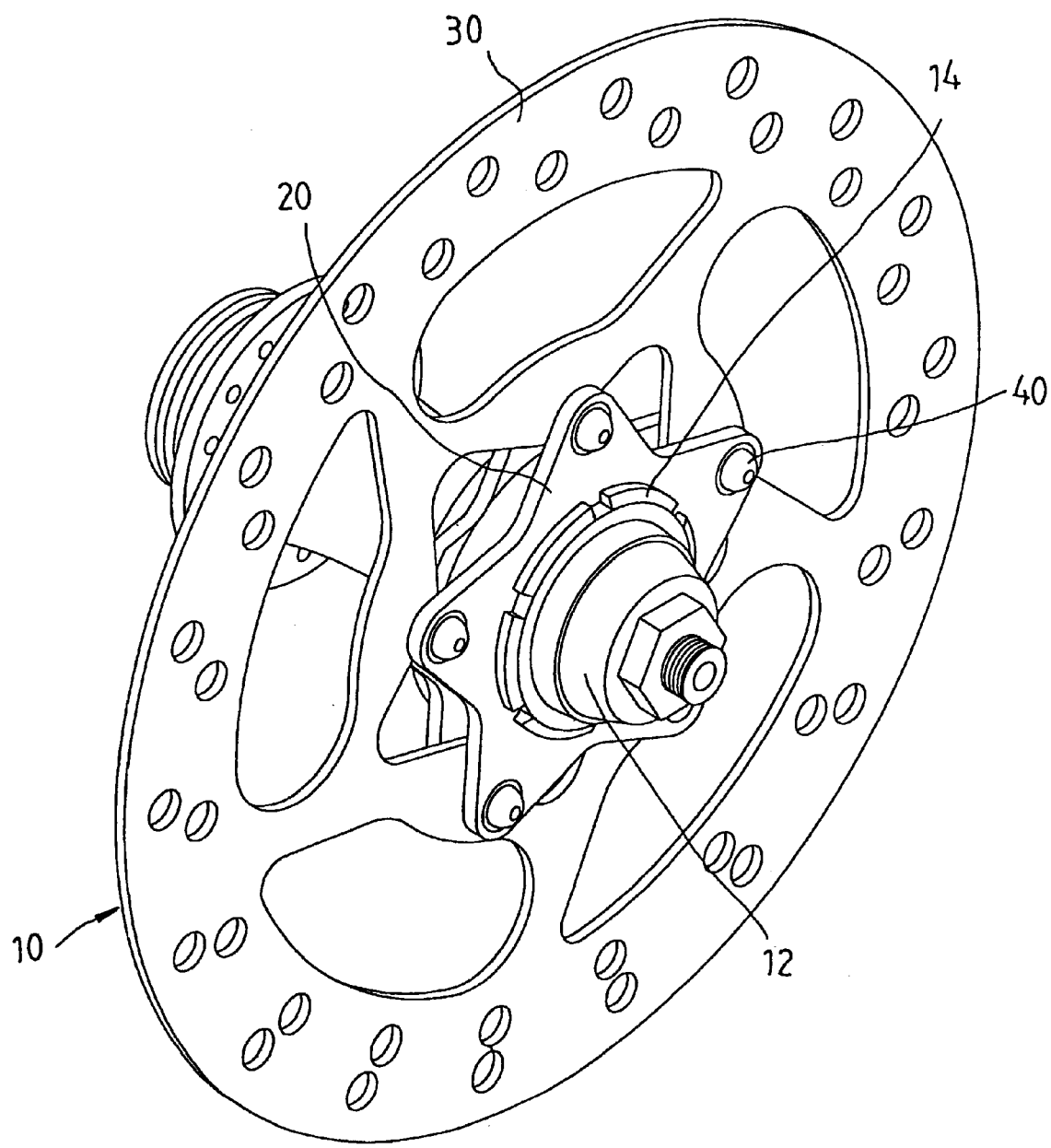
FIG. 3 shows a schematic view of a braking disc assembly of a preferred embodiment of the present invention mounted on a bicycle hub.
Figure 4:
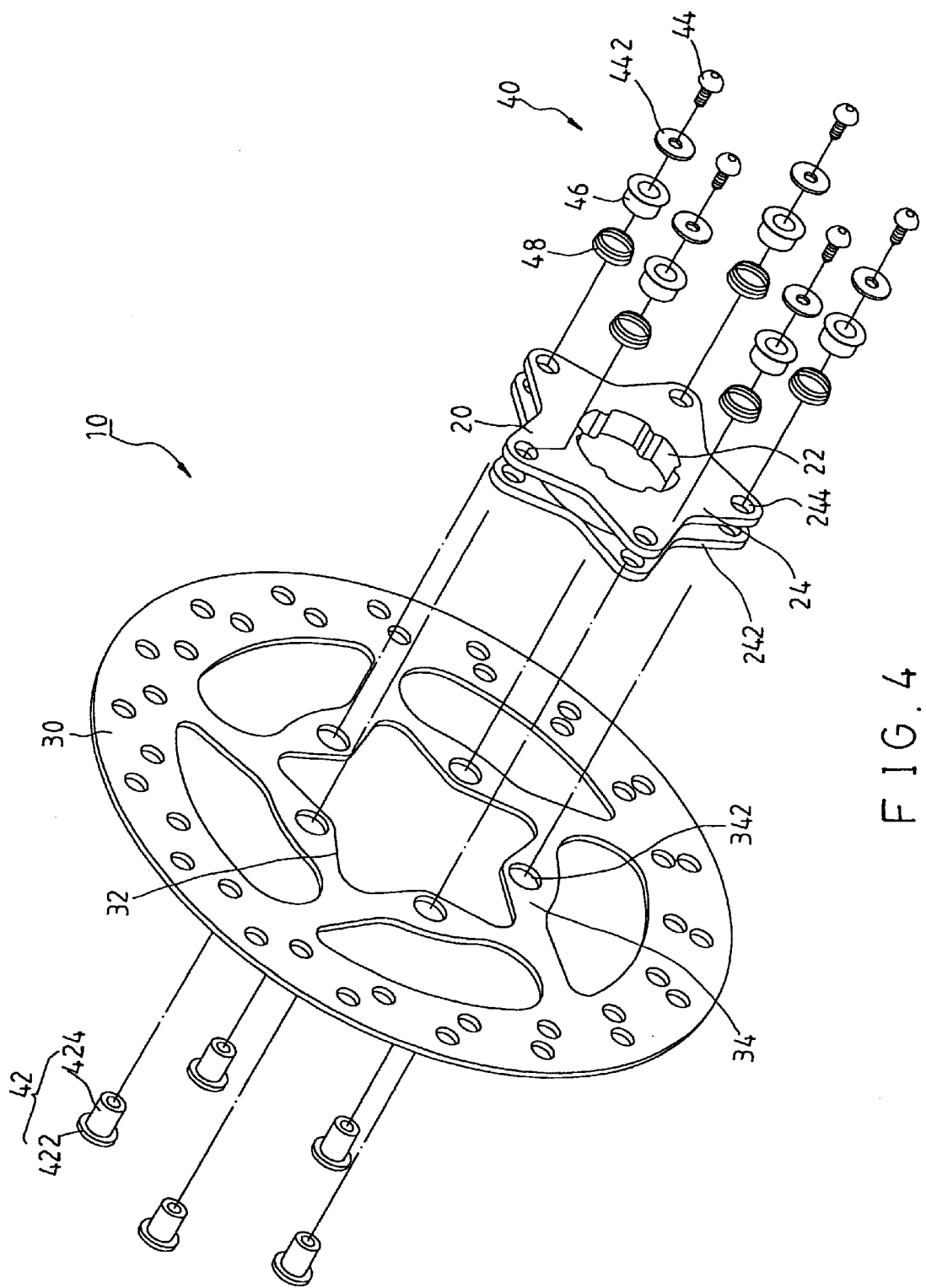
FIG. 4 shows an exploded view of the braking disc assembly of the preferred embodiment of the present invention.
Figure 5:
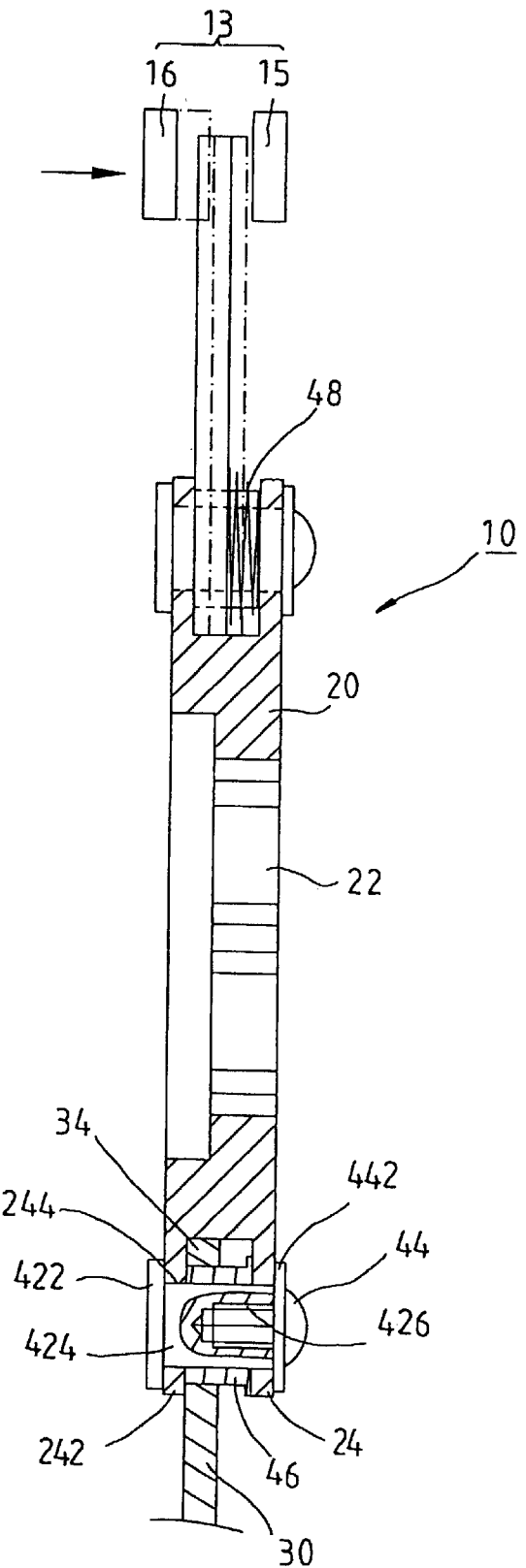
FIG. 5 shows a sectional schematic view of the preferred embodiment of the present invention in action.

As shown in FIGS. 3–5, a braking disc assembly 10 embodied in the present invention is mounted on a bicycle hub 12 such that the braking disc assembly 10 works along with a disk brake 13 of the bicycle to slow down or stop the bicycle in motion. The braking disc assembly 10 of the present invention comprises a fastening seat 20, a disc body 30, and five connection sets 40.

The fastening seat 20 is of a stellar construction and is provided in the center thereof with a through hole 22 which is fitted over one end of the hub 12 in conjunction with a nut 14, as shown in FIG. 3. The fastening seat 20 is provided in the fringe thereof with five clamping portions 24 which are arranged equidistantly. Each of the five clamping portions 24 is formed of two clamping pieces 242 which are parallel to each other and are separated from each other by a predetermined distance. The clamping pieces 242 are provided with a through hole 244.

The disc body 30 is provided in the center thereof with a hollow portion 32 of a stellar profile, and five insertion portions 34 which are located along the outer edge of the hollow portion 32 and are provided with a locating hole 342 corresponding in location to the through hole 244 of the clamping pieces 242. The disc body 30 has a thickness smaller than the distance between the two clamping pieces 242. The fastening seat 20 is fitted into the hollow portion 32 of the disc body 30 such that the insertion portion 34 is located between the two clamping pieces 242 of the clamping portion 24.

Figure 6:
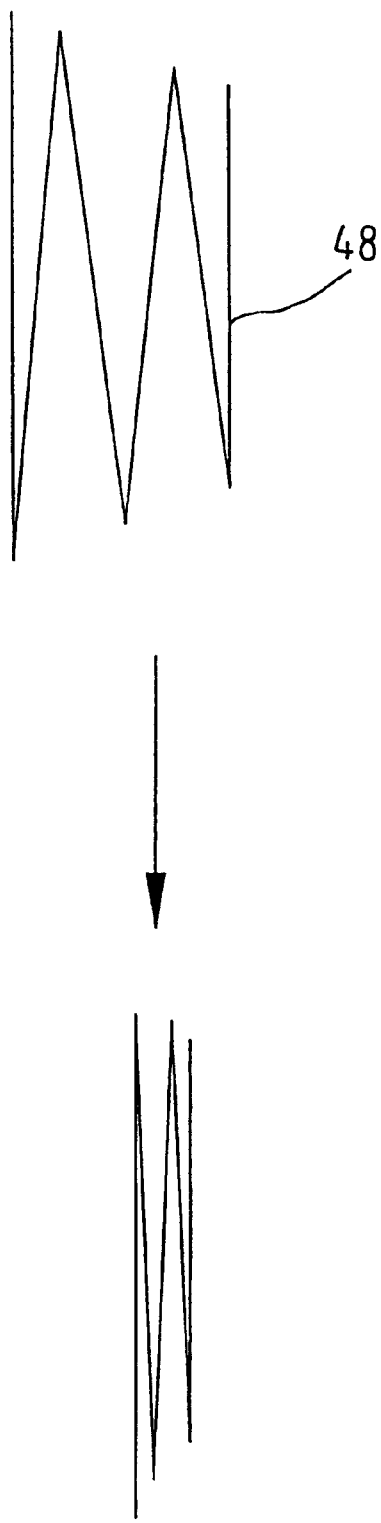
FIG. 6 shows a side schematic view of the spring of the preferred embodiment of the present invention at work.

Each of the connection sets 40 is composed of a locking member 42, a bolt 44, a protective sleeve 46, and a spring 48. The locking member 42 has a head 422, a shank 424 extending from the head 422, and an inner threaded portion 426 of a depth and extending toward the head 422 from the free end of the shank 424. The fastening seat 20 and the disc body 30 are joined together by the connection sets 40 such that each locking member 42 is put through the through hole 244 of the clamping piece 242 of the fastening seat 20 and the locating hole 342 of the disc body 30, and that the inner threaded portion 426 of the locking member 42 is engaged with the bolt 44 in conjunction with a washer 442. The protective sleeve 46 is fitted over the shank 424 of the locking member 42 to prevent the wear of the locking member 42 and the noise, which are brought about by the mechanical friction between the locking member 42 and the disc body 30. The spring 48 is fitted over the shank 424 of the locking member 42 such that one end of the spring 48 urges the insertion portion 34 of the disc body 30, and that other end of the spring 48 urges the clamping piece 242 of the fastening seat 20. The two ends of the spring 48 are not equal to each other in terms of diameter, as shown in FIG. 6. As the spring 48 is exerted on by a small force to compress, its compression can reach a maximum in a limited space without the application of a greater lateral force.

When the disc body 30 is clamped by the disc brake 13 such that the disc body 30 is acted on by a lateral force, the disc body 30 can adjust its position in a floating manner by compressing the spring 48. As a result, the disc body 30 can be caused by an extremely small lateral force to displace in relation to the fastening seat 20, thereby resulting in an optimal braking effect brought about by the disc body 30 and the disc brake 13.

The disc brake 13 is generally formed of a fixed brake piece 15, and a movable brake piece 16 which can be caused to move toward the fixed brake piece 15, as illustrated in FIG. 5. The disc body 30 of the present invention is located between the two brake pieces 15 and 16 such that the disc body 30 is separated from the two brake pieces 15 and 16 by a predetermined distance. When the movable brake piece 16 is moved toward the fixed brake piece 15, the disc body 30 is exerted on by a lateral force to compress the spring 48. The spring 48 of the preferred embodiment of the present invention is disposed on one side of the disc body 30. Depending on the nature of the disc brake, the spring 48 may be disposed on other side of the disc body 30 or both sides of the disc body 30.

What is claimed is:

1. A braking disc assembly mounted on a hub of a bicycle to bring about a braking effect in conjunction with a disc brake of the bicycle, said braking disc assembly comprising:

a fastening seat mounted on the hub of the bicycle and provided with at least two clamping portions, with each said clamping portion having two clamping pieces whereby said two clamping pieces are separated from each other by a distance and are provided with a through hole;

a disc body provided in a center thereof with a hollow portion to accommodate said fastening seat, said disc body further provided with at least two insertion portions, with each said insertion portion having a locating hole corresponding in location to said disc body having a thickness smaller than the distance between said two clamping pieces; and at least two connection sets, with each said set comprising a locking member, a bolt, and a spring, said locking member having a head and a shank of a length and extending from said head, said shank being provided in a free end thereof with an inner threaded hole, said spring being fitted over said shank of said locking member;

said fastening seat being joined with said disc body such that said fastening seat is disposed in said hollow portion of said disc body, and that said insertion portions are respectively located between said two clamping pieces of each of said clamping portions of said fastening seat, and further that said fastening seat and said disc body are fastened together by said locking member which is received in said through hole of said clamping pieces of said fastening seat and said locating hole of said disc body, and still further that said bolt is engaged with said inner threaded hole of said shank of said locking member, and still further that said spring urges at one end thereof said fastening seat, and at other end thereof said disc body, thereby enabling said disc body to make an adjustment in position at such time when said disc body is pressed against by two brake pieces of the disk brake of the bicycle.

2. The braking disc assembly as defined in claim 1, wherein said shank of said locking member is provided with a protective sleeve fitted thereover such that said protective sleeve is located between said locking member and said spring so as to prevent said locking member from making a direct contact with said disc body.

3. The braking disc assembly as defined in claim 1, wherein said one end of said spring is different in diameter from said other end of said spring.

4. The braking disc assembly as defined in claim 1, wherein said fastening seat is provided with five clamping portions; and wherein said disc body is provided with five insertion portions.

* * * * *